United States Patent [19]

Hosoi

[11] 4,222,690
[45] Sep. 16, 1980

[54] DRILL HAVING CUTTING EDGES WITH THE GREATEST CURVATURE AT THE CENTRAL PORTION THEREOF

[76] Inventor: Ryosuke Hosoi, 5-9-10, Kami-minami, Hirano-ku, Osaka, Japan

[21] Appl. No.: 961,810

[22] Filed: Nov. 17, 1978

[30] Foreign Application Priority Data

| Dec. 3, 1977 [JP] | Japan | 52-145587 |
| Dec. 3, 1977 [JP] | Japan | 52-145588 |
| Dec. 3, 1977 [JP] | Japan | 52-145589 |
| Jan. 31, 1978 [JP] | Japan | 53-10136 |

[51] Int. Cl.³ .............................. B23B 51/02
[52] U.S. Cl. ...................... 408/230; 407/54; 408/144
[58] Field of Search ............... 408/56, 144, 713, 230, 408/226; 407/53, 54; 51/288

[56] References Cited

U.S. PATENT DOCUMENTS

| 2,778,252 | 1/1957 | Oxford, Jr. | 408/230 |
| 3,680,262 | 8/1972 | Aydelott et al. | 51/288 X |
| 4,123,186 | 10/1978 | Hoadley | 407/54 |
| 4,132,493 | 1/1979 | Hosoi | 407/53 |

Primary Examiner—Z. R. Bilinsky
Attorney, Agent, or Firm—Jordan and Hamburg

[57] ABSTRACT

A drill comprising a pair of cutting edges extending from the center of rotation of the drill symmetrically with respect to the center and curved outwardly away from the direction of rotation of the drill with a greater curvature in the center portion than in the outer peripheral portion of the drill when seen in a bottom view. The cutting edge is formed, close to its starting end, with a rake face having a rake angle approximately to zero to enable the starting end portion of the edge to cut a workpiece with greater ease.

2 Claims, 21 Drawing Figures

DRILL HAVING CUTTING EDGES WITH THE GREATEST CURVATURE AT THE CENTRAL PORTION THEREOF

The present invention relates to improvements in the shape of the cutting edge of drills, and more particularly to improved drills adapted for a high-feed machining operation.

Conventional drills include a chisel portion which involves such a contradiction that if it is adapted to cut with improved sharpness with smooth removal of chips, the chisel portion has insufficient rigidity, whereas the chisel portion, when possessing enhanced rigidity has a poor cutting ability and is unsuited to a high-feed operation. Furthermore workpieces in recent years include many of those having high hardness which are difficult to cut, so that it becomes necessary to use cemented carbide alloys for drills, but the use of cemented carbide alloys still fails to give an improved cutting efficiency to the center portion of the drill where the cutting speed is nearly zero and the rake angle of the chisel portion has an exceedingly large negative angle. Additionally the drill center portion is subject to compression load corresponding to the amount of feed. To overcome such a problem, I have already provided a drill having cutting edges with the greatest curvature at the central portion thereof. However, even if the drill center portion is designed to have an improved cutting ability with the aforesaid cutting edge, chips will not be smoothly removable unless the portion of the cutting edge close to the center portion is formed with a desired rake face. If chips are not smoothly removable, they cause damage to the drill when it is used for high-speed or high-feed machining operation. Another problem is encountered with conventional drills formed with twisted grooves. When the drill is used for a high-speed high-feed drilling operation, the chip produced is forced against the grooved surface, causing the end of the chip elongated to bite into the bore inner surface and fuse thereto. This phenomenon will impede the rotation of the drill shank, possibly breaking the drill.

Accordingly an object of the present invention is to provide a drill having cutting edges suitably shaped for a high-feed machining operation.

Another object of this invention is to provide a drill which, when incorporating a tip of cemented carbide alloy, has an improved cutting ability at its center portion while permitting smooth removal of chips.

Another object of this invention is to provide a drill having high rigidity in itself and an enhanced cutting ability.

Another object of this invention is to provide a drill which bites into the workpiece effectively especially at its center portion.

Still another object of this invention is to provide a drill which permits smooth removal of chips.

Other features and advantages of the invention will become more apparent from the following description given with reference to the accompanying drawings, in which.

Figure 1:
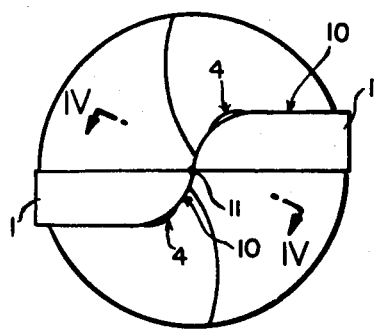
FIG. 1 is a bottom view showing a drill embodying the invention.
Figure 2:
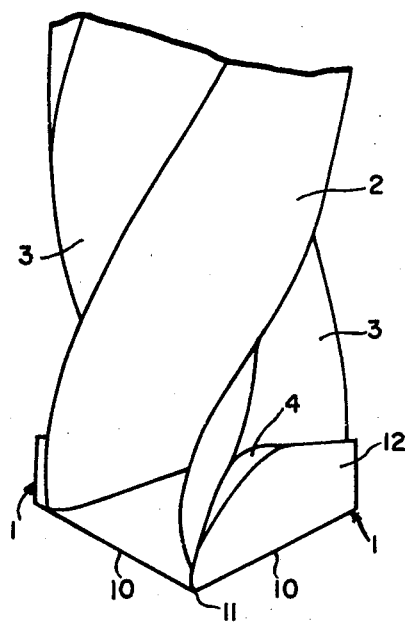
FIG. 2 is a side elevation of the drill.
Figure 3:
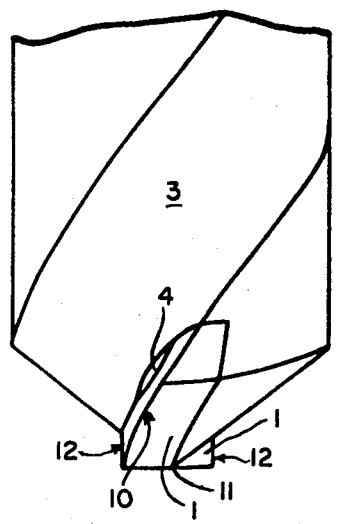
FIG. 3 is a side elevation of the drill as it has been turned from the position in FIG. 2 through 90 degrees about its axis.
Figure 4:
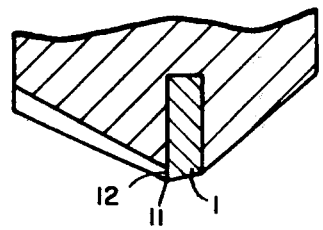
FIG. 4 is a view in section taken along the line IV—IV in FIG. 1.
Figure 5:
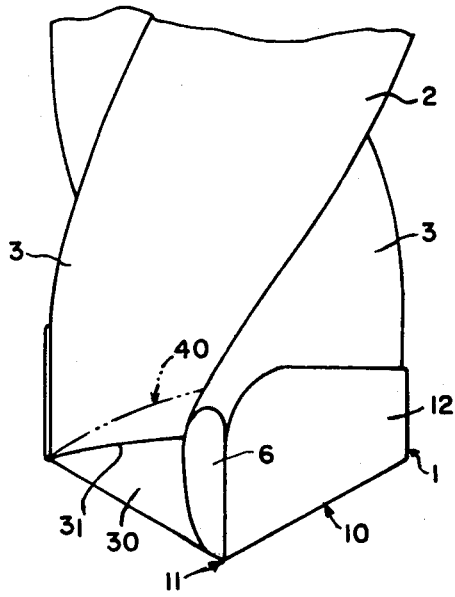
FIG. 5 is a side elevation showing another drill embodying the invention.
Figure 6:
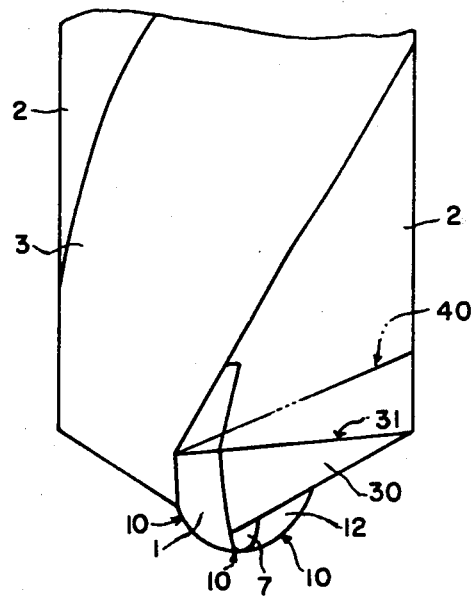
FIG. 6 is a right side view of the drill shown in FIG. 5.
Figure 7:
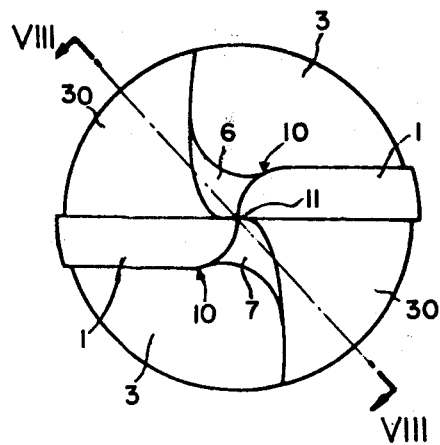
FIG. 7 is a bottom view of the same.
Figure 8:
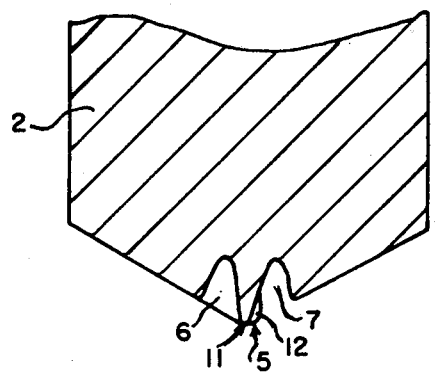
FIG. 8 is a view taken along the line VIII—VIII in FIG. 7.
Figure 9:
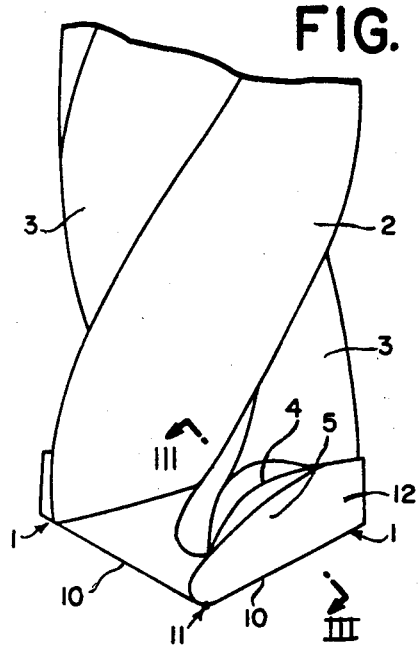
FIG. 9 is a side elevation showing another embodiment of the invention.
Figure 12:
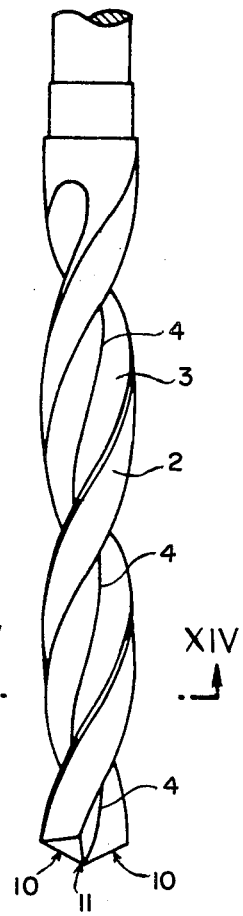
Figure 13:
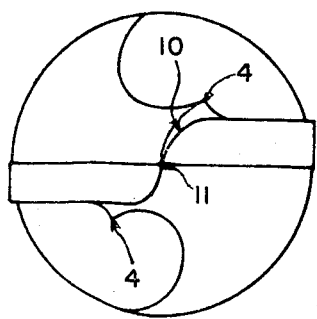
Figure 14:
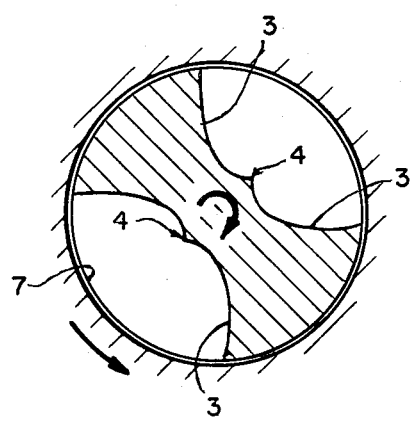

FIGS. 11(a) to (e) are views in section taken along the line XI—XI in FIG. 9 to show the drill during cutting operation;

FIG. 12 is a side elevation showing another embodiment of the invention;

FIG. 13 is a bottom view of the same;

FIG. 14 is a view in section taken along the line XIV—XIV in FIG. 12; and

Figure 15A:
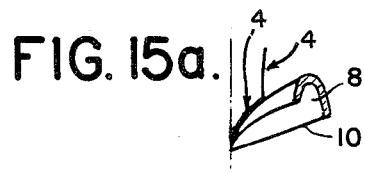
Figure 15B:
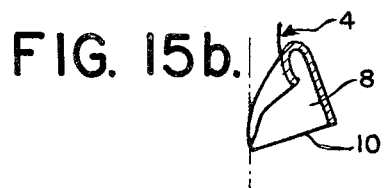
Figure 15C:
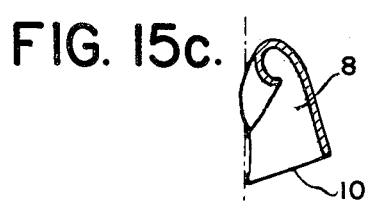

FIGS. 15(a) to (c) are diagrams illustrating how a chip is formed.

The drill shown in FIGS. 1 to 4 includes tips 1, a shank 2, twisted grooves 3 and a conical end having a center point 11 at the apex of the cone and a pair of cutting edges 10 extending from the center point 11 symmetrically with respect to the center point 11. Each of the tips 1 is made for example from cemented carbide alloy in the form of a plate and attached to the conical end of the shank 2 by brazing, or by bolt as a throw-away piece. Instead of attaching the separate tips to the shank 2, the tips may be formed integrally with the shank 2. When seen from the bottom, the cutting edge 10 is curved outward away from the direction of rotation of the drill with a curvature increasing from the outer periphery of the drill toward the center. The outer portion of the edge is substantially straight. The portion of each cutting edge corresponding to a chisel is not formed with a chisel but provided with a rake face 12 having a rake angle approximate to zero. The rake angle progressively increases toward the outer periphery of the drill. Projections 4, serving as chip breakers, act to bend chips and break them into small fragments to render the chips smoothly removable.

When the drill is used for drilling, chips slip sidewise on the rake faces 12 at the center portion where the cutting speed is lower. Further since chips have a smaller thickness at the center portion than at the peripheral portion, the edge part at the center portion can be prevented from fracture.

With conventional drills, the chisel portion at the center of the cutting edge does not have a definite cutting ability and involves great contradiction in serving as a cutting edge, permitting chips to be forced against the cutting edge and impair a smooth cutting operation. Drills made of cemented carbide alloy are therefore susceptible to fracture at the center portion. For this reason, high-speed steel drills have a low cutting ability, while cemented carbide alloy drills are not usable for cutting steel materials. With the construction described above, the cutting edge, which is slanting toward the direction of advance, permits sidewise slippage of chips, with the result that the chips have a reduced thickness and will not produce high cutting resistance. Being unlikely to be pressed against the cutting edge, chips are smoothly removable, ensuring a satisfactory cutting operation. Since the cutting edges have an increasing curvature toward the center point, with the rake faces extending from the center point, the drill will not slip on the workpiece but bites into the workpiece effectively despite the slow movement of the cutting edges at the center portion.

The features described above make it possible to use usual tool steels and cemented carbide alloys for the drill of this invention. Whereas cutting edges of the conventional shape are prone to fracture at the center portion where the edge advances at a lower speed so that cemented carbide alloys are not suited for usual cutting edges, cemented carbides are usable in this invention free of fracture because the edges near the center portion encounter only reduced resistance while permitting sidewise slipping of chips. The use of cemented carbide alloys enables the drill to cut materials which are difficult to cut or have high hardness, further imparting an improved cutting ability to the drill. Thus the amount of cutting by the drill of cemented carbide alloy can be 5 to 6 times the amount heretofore possible. This ensures a high-speed operation.

FIGS. 5 to 8 show another embodiment which basically has substantially the same construction as the embodiment of FIGS. 1 to 4 except that cavities 6 and 7 are formed to provide rake faces at the starting portions of the cutting edges 10. Each of the cavities 6 and 7 is formed because if the surface defining the twisted groove 3 is spontaneously extended to the starting end of the cutting edge 10 to provide a rake face, hardly any rake face will be formed at the starting end of the cutting edge 10. The cavity formed at the starting end portion thus provides a sufficient rake race 12. An enlarged rake face may be formed at the starting end without providing the cavity by lowering the drill head 30 so that the end 31 of the head 30 will be at the position of the phantom lines 40 in FIGS. 5 and 6, but the head 30 supporting the tips 1 will then have a reduced volume, thus failing to support the tips with sufficient strength to withstand a heavy-duty cutting operation. The cavities 6 and 7 nevertheless provide sufficient rake faces at the starting ends of the cutting edges without reducing the strength of the tip supporting head.

Figure 10:
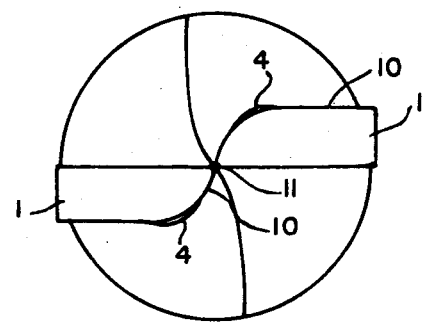
FIG. 10 is a bottom view of the same.

FIGS. 9 to 11 show another embodiment of this invention which basically has substantially the same construction as the foregoing embodiments except that each rake face 12 is formed, where it is continuous with the twisted groove 3, with a projection 4 serving as a chip breaker. The projection may be suitably shaped in accordance with the cutting conditions concerned.

Figure 11A:
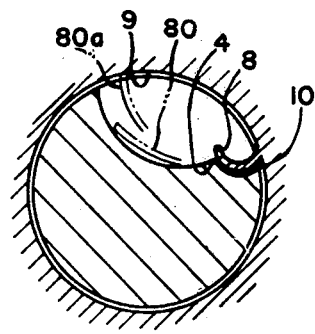
Figure 11B:
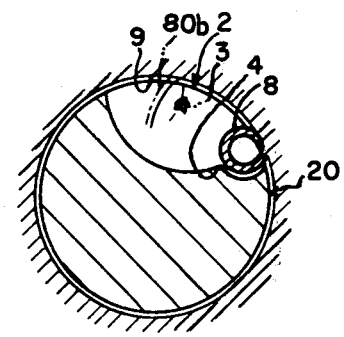
Figure 11C:
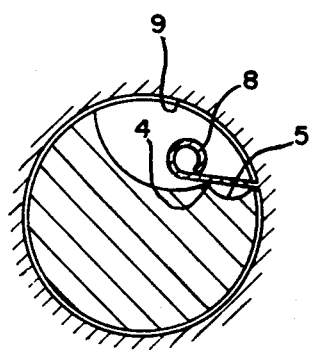
Figure 11D:
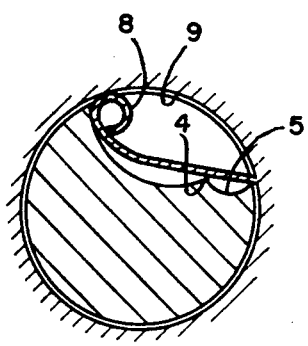
Figure 11E:
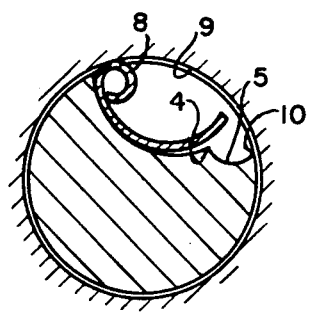

The action of chip breakers will be described with reference to FIGS. 11(a) to (e). When a drill having no chip breaker is used for a high-feed machining operation, the resulting chip, which is thick, engages in between the outer periphery of the drill and the surface 9 defining the drilled bore when ascending the twisted groove 3. As a result, the chip bites into the bore defining surface and fuses thereto, interfering with the rotation of the drill, impeding the removal of chips and producing flaws on the outer peripheral surface of the drill. With the construction described above in which the projection 4 is formed on the rake surface 12 with a cavity 5 of marked curvature provided between the projection 4 and the cutting edge 10, a chip 8 in FIG. 11(a) first curls along the caved portion 5 to the state shown in FIG. 11(b) and then extends to the state of FIG. 11(c) and thereafter to the state shown in FIG. 11(d), striking the bore defining surface 9 with its forward end, whereupon further growth of the chip is prevented, with the result that the chip 8 is broken off as seen in FIG. 11(e). Even when striking the bore defining surface, the end of the chip 8 which is rounded will not fuse thereto. In this way small fragments of chips with a rounded end are sent upward in succession for removal.

The cavity 5 is inevitably formed by providing a projection 4 between the cutting edge 10 and the twisted grooved portion 3. Unless the projection 4 is formed, a chip 80 is sent forward along the twisted groove 3 without curling as indicated in the phantom line in FIG. 11(a) with its forward end 80a brought into striking contact with the inner surface 9. Subsequently the chip is engaged in the space between the drill outer periphery 20 and the bore defining surface 9 and fused as indicated at 80b in FIG. 11(b), marring the outer peripheral surface 20 and the inner surface 9, interfering with the rotation of the drill and impeding removal of chips to be thereafter produced. Even if the forward end of the chip does not lodge in the bored surface, a continuous curly chip will extend along the groove 3 while being rubbed against the twisted grooved surface 3 and the inner surface 9, producing frictional resistance which increases in proportion to the length of the chip and consequently preventing the chip from ascending along the twisted groove. As a result, the chip will be lodged similarly.

FIGS. 12 to 15 show still another embodiment of the invention in which a projection 4 serving as a chip breaker continuously extends approximately from the starting end of the cutting edge 10 along the center of each twisted groove 3. When used for high-feed machining, the drill produces a thick chip 8 which extends along the grooved surface in the direction of a normal of the cutting edge 10. The forward end of the chip is bent and wound one turn by the projection 4 in the manner shown in FIGS. 15(a) to (c). The chip is then pushed out over the projection 4 and forced at its forward end against the inner surface defining the drilled bore, whereby the chip is broken off. The chip 8 now in the shape shown in FIG. 15(c) ascends along the twisted groove 3. The chip 8, having a curled forward end, will not fuse to the bore defining inner surface when striking the surface. Without the projections 4, the drill, if used for high-speed high-feed machining, would produce an elongated continuous chip which would be discharged while turning, entailing hazards during operation. Moreover chips would be likely to lodge in the bored surface. However, the drill of the foregoing construction produces fragmented small chips having a curled forward end and smoothly removable through the twisted grooves. Since the projection of the above construction continuously extends on the grooved surface longitudinally thereof, the projection remains as such and fulfils the contemplated function even when the drill becomes progressively shorter owing to resharpening of worn cutting edges.

What is claimed is:

1. A drill comprising a pair of cutting edges each starting at the center of rotation of the drill and extending symmetrically with respect to said center and curved outwardly away from the direction of rotation of the drill with a greater curvature in the radial inner portion than in the outer peripheral portion of the drill when viewed from the bottom of the drill, each of the cutting edges being formed with a rake face starting at said center of rotation and having a rake angle approximately equal to zero at the radial inner portion of said rake face, said drill having twisted grooves, and means defining a cavity formed in said twisted grooves close to said starting end of each of the cutting edges to provide an increase in rake face at the inner radial portion of the cutting edge in the vicinity of said starting end of said cutting edge.

2. A drill as defined in claim 1 wherein the cutting edge is shaped to have a curvature increasing toward the center and extends substantially straight toward the outer periphery of the drill when seen in a bottom view.

* * * * *